United States Patent
Langlechner

[19]

[11] Patent Number: 6,161,419

[45] Date of Patent: Dec. 19, 2000

[54] PROCESS AND DEVICE FOR DETERMINING THE CHARACTERISTICS OF A MOTOR VEHICLE'S BUILT-IN SHOCK-ABSORBERS

[75] Inventor: Richard Langlechner, Unterneukirchen, Germany

[73] Assignee: Snap-On Technologies, Inc., Lincolnshire, Ill.

[21] Appl. No.: 08/750,533

[22] PCT Filed: Aug. 17, 1995

[86] PCT No.: PCT/EP95/03268

§ 371 Date: Dec. 13, 1996

§ 102(e) Date: Dec. 13, 1996

[87] PCT Pub. No.: WO96/07883

PCT Pub. Date: Mar. 14, 1996

[30] Foreign Application Priority Data

Sep. 6, 1994 [DE] Germany .............................. 44 31 794

[51] Int. Cl.[7] .................................................. G01M 17/04
[52] U.S. Cl. ...................... 73/11.08; 73/12.06; 73/118.1; 73/11.09
[58] Field of Search ................................. 73/11.04, 11.05, 73/11.08, 11.09, 12.01, 12.04, 12.06, 118.1

[56] References Cited

U.S. PATENT DOCUMENTS

| | | | |
|---|---|---|---|
| 3,712,122 | 1/1973 | Harris et al. ............................ | 73/12.01 |
| 3,981,174 | 9/1976 | Himmler ................................. | 73/11.08 |
| 4,761,991 | 8/1988 | Femböck ................................. | 73/11 |
| 5,056,024 | 10/1991 | Stuyts .................................... | 73/11.08 |
| 5,394,731 | 3/1995 | Shechet et al. ......................... | 73/11.04 |
| 5,648,902 | 7/1997 | Honda .................................... | 73/11.08 |
| 5,665,901 | 9/1997 | Ilzig et al. ............................. | 73/11.08 |
| 5,756,877 | 5/1998 | Nozaki ................................... | 73/11.09 |
| 5,767,382 | 6/1998 | Buchanan ............................... | 73/11.08 |

FOREIGN PATENT DOCUMENTS

| | | |
|---|---|---|
| 0 226 981 | 7/1987 | European Pat. Off. . |
| 0 611 960 | 8/1994 | European Pat. Off. . |
| 89/12811 | 12/1989 | WIPO . |

*Primary Examiner*—George Dombroske
*Attorney, Agent, or Firm*—McDermott, Will & Emery

[57] ABSTRACT

A process is proposed for determining the characteristics of a motor vehicle's built-in shock absorbers. The vehicle is driven onto a ramp support which is then quickly removed, causing the vehicle to drop onto a base whose distance below the ramp support corresponds to the residual rebound clearance associated with the particular vehicle design; the changes in the so-called wheel contact force when the car hits the base are measured. The process is characterized by the fact that the vibration characteristics of the body and one wheel at a time are measured, the measurement results, together with the measured values of wheel contact force, are fed into the known differential equations governing damped oscillations, and the characteristic data for the vehicle structure, namely, the body- and wheel masses, spring stiffness and damping constants, are calculated.

12 Claims, 7 Drawing Sheets

PROCESS AND DEVICE FOR DETERMINING THE CHARACTERISTICS OF A MOTOR VEHICLE'S BUILT-IN SHOCK-ABSORBERS

The invention relates to a process for determining the characteristics of the shock-absorbers installed in a motor vehicle. According to this process, the vehicle is run up a ramp and onto a support surface which is then removed suddenly so that the vehicle drops onto a base. The vertical distance between the base and the support surface corresponds to the residual wheel-rebound-clearance imposed by the design of the vehicle concerned. When the vehicle hits the base, the curve of the wheel-contact force exerted on the base is determined.

This process is described in EP Patent 2 269 81 [sic]. Using this process to test the condition of the running gear of a motor vehicle, it is already possible, by suitable curve-analysis of the results representing the wheel-force on the base, to produce, among other things, findings regarding the damping characteristics of the suspension joints of a motor vehicle, the quality of the shock-absorbers, and the hardness of the vehicle's springs. However, an evaluation of a vehicle's vibration-behaviour based on the graphs obtained when measuring the wheel-contact forces on the base provides no absolute characteristic-data values for the vehicle at the time of testing, because the effects of tyre-pressure, vehicle-loading, and the type of tyre fitted cannot be taken into account.

The aim of the present invention is to develop a process whereby the characteristics of a shock-absorber fitted to a motor vehicle can be determined without having to detach the shock-absorber, irrespective of such variables as the tyre-pressure, type of tyre, vehicle-load, etc. In other words, the aim of the invention is to provide a process whereby all those forces which, in the known process, codetermine the vibration-behaviour of the vehicle once it hits the base, can be eliminated; and whereby the actual values for the damping constants and spring-stiffness—i.e. the current condition of the shock-absorber—can be computed from the measured values.

This aim is achieved as follows, according to the invention:
- the vibration-behaviour of the body and of one wheel at a time is measured,
- the measurement results thus obtained, together with the measured values for the wheel contact force, are introduced into the known differential equations for damped vibrations, and
- the characteristic data for the running gear of a motor vehicle are computed—said characteristic data being: the body and wheel masses, spring-stiffness, and damping constants.

The advantage of the process according to the invention, compared with the prior-art processes, is that the result obtained with the process according to the invention is independent of the tyre-pressure, type of tyre, or loading of the tested vehicle, and gives the actual values valid at the time of testing.

By determining the overall vibration-behaviour of the body and of one wheel in each case, it is possible to obtain not only a damping-value, but also the damping-characteristic of the shock-absorber, divided into tension and compression regions. A further advantage of the new process is that the total testing-time is very short, and both wheels of a wheel-axis can be tested simultaneously after the shock-producing impact. As well as the characteristic curve for the shock-absorber, the stiffness of the vehicle's springs and the effective masses can also be determined.

The possibility of obtaining all the data needed to evaluate the condition of the vehicle by means of a single, brief measuring operation, makes the process suitable for:
- series-testing e.g. by regulatory authorities, and by the automobile industry (for end-of-production-line checking and running-gear analysis); and
- workshop diagnosis of faults in motor vehicles already in service, because the process of the invention enables the vehicle's actual values to be compared with the required values.

Preferably the vibration-behaviour of the vehicle-body and of each wheel of the wheel-axis being tested can be determined by measuring the displacement of the translational vibrations of the body and wheel, for each side of the wheel-axis being tested; such displacement-measurement is performed either by individually determining the vibration-amplitudes of the body relative to the base and the vibration-amplitudes of the wheel relative to the base, or by determining the amplitude-difference between these two vibrations. It may be preferred, however, to determine the curve of the vibration by measuring the velocity of the motion of the body and wheel, or by measuring the acceleration during the motion of the body and wheel, after they have hit the bases.

An apparatus suitable for performing these measurements comprises:
not only
- the measuring device (known in the art) for measuring the characteristic curve of the wheel contact force on the base,
- the base, with an up-ramp and removable vehicle support surface arranged above this base at a height corresponding to the residual rebound clearance of the vehicle, and
- a measuring device for determining the curve of the wheel contact force acting on this base after the vehicle has dropped onto it, as a function of time, but also
- a further measuring system suitable for determining the curve of the vibration-behaviour of the body and wheel as a function of time.

A measuring system of this type can comprise an inductive pick-up, a velocity-measuring means, an acceleration-measuring means, or a [laser]; or it can be equipped with an image-recording system.

Details of the measurement-process, the design of suitable devices for its implementation, and the method of evaluating the measurement-results, will emerge from the following description of examples of the implementation of the invention, and from the drawings, in which.

Figure 1:
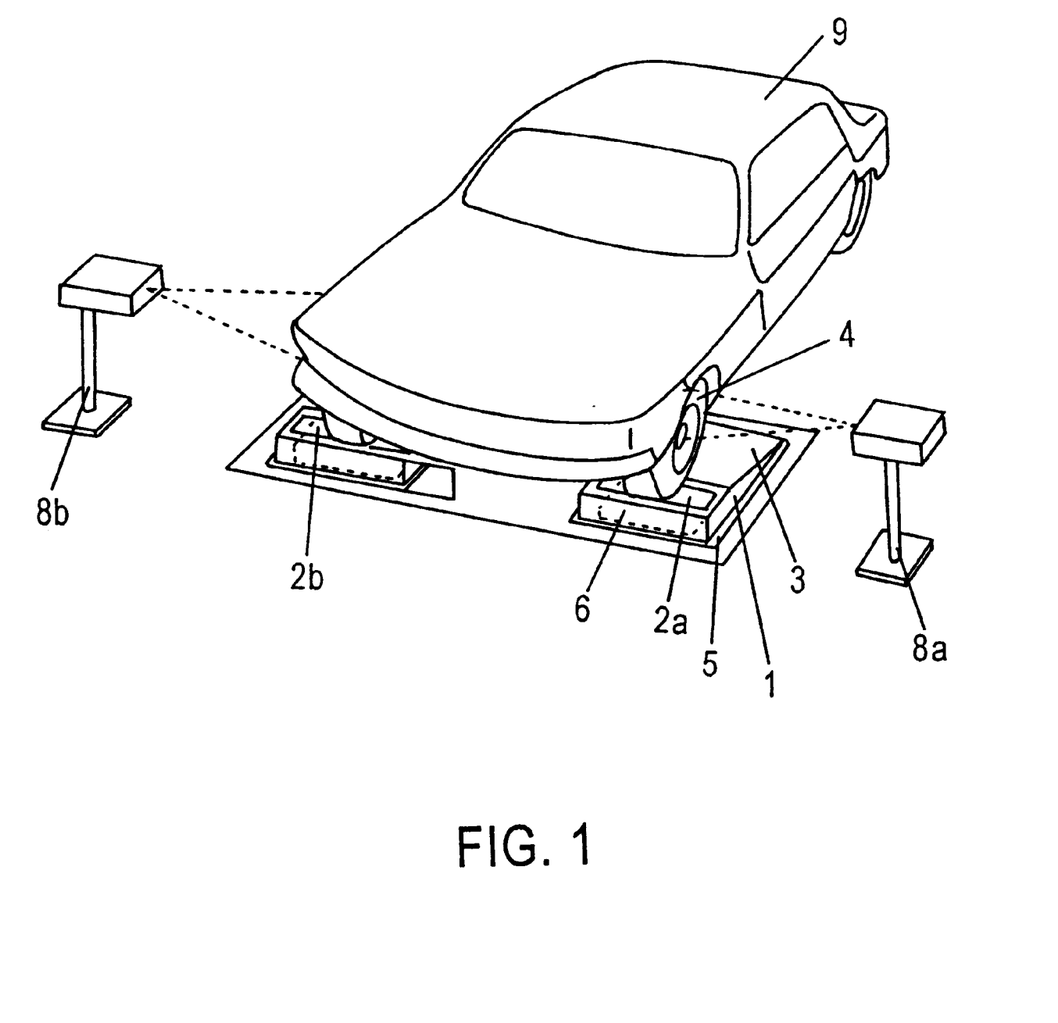
FIG. 1 is a diagrammatic representation of a test stand, with which an image-recording system is being used.

A test stand for implementing the novel testing process comprises a ramp 1, with two trapdoor-like drop panels 2a, 2b at the top. The distance between these two drop panels 2a, 2b is approximately the same as that between the two wheels of a wheel-axis of a motor vehicle. The motor vehicle that is to be tested is driven up an inclined approach surface 3, so that the two wheels 4 of either its front or its rear wheel-axis come to rest on the drop panels 2a, 2b. The upper surface of the drop panels 2a, 2b is approximately 50 mm above a base 5, which is designed as a weighing unit 6, e.g. a strain gauge or the like. The selection of the distance 7 between the drop panels 2a, 2b and the base is determined by the residual rebound clearance (i.e. the distance between the wheel axle and a resilient stop) imposed by the design of the vehicle. This is so as to prevent the wheel—during its free fall after the dropping-away of the panels 2a, 2b—from being arrested by the resilient stops before reaching the base 5, which would lead to false vibration-results.

The weighing unit 6 serves to measure, as a function of time, the force on the base 5 resulting from the vibration-behaviour of the vehicle after the wheels 4 have hit the base 5.

This force will be referred to below as the "wheel contact force". It constitutes an essential component for the subsequent numerical determination of the characteristics of the shock-absorber.

A displacement-measuring system 8a, 8b is provided beside, but at some distance from, each of the front wheels 4 of the motor vehicle resting on the test stand. In FIG. 1, the displacement-measuring system 8a, 8b is in the form of an image-recording system, which makes it possible to record the curve of the vibrations of the body 9 and wheel 4 without coming in contact with them. The curve of the vibration amplitudes of the body 9 and wheel 4 after falling through the drop distance 7 forms the second component necessary for the numerical determination of the characteristics of the shock-absorber. For this purpose, targets are applied to the wheel and vehicle-body, and the vibration processes are determined by means of an image-processing system. The target for the body consists of a bar pattern, and the target for recording the wheel-vibrations consists of a rotationally-symmetrical pattern of alternate black and white rings.

Figure 7A:
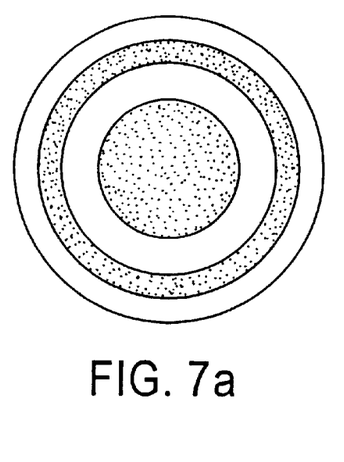
FIG. 7a shows a target to be applied to the wheel of the motor vehicle.
Figure 7B:
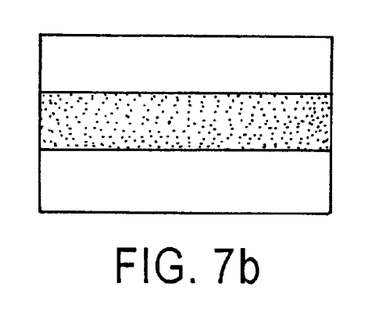
FIG. 7b shows a target to be applied to the body of the motor vehicle.
Figure 7C:
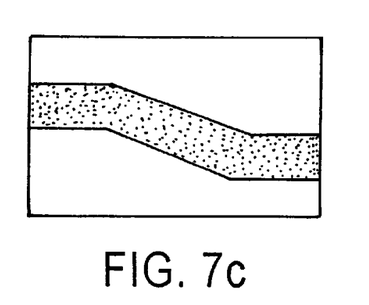
FIG. 7c shows a target to be applied to the vehicle's body, enabling the movement of the body in both the vertical and the horizontal directions to be determined.

However, when the motor vehicle falls onto the base, body-vibrations not only occur in the vertical direction, but also, at the time of impact, small body-vibrations are detected in the vehicle's longitudinal direction as well. Because the measuring-method used here gives extremely accurate measurements of vibration-behaviour, these horizontal vibration movements should also not be ignored. In order to detect them, however, it has proved advantageous to modify the target bar pattern known in the art, which consists of horizontal black and white bars. This pattern is altered in such a way that the back-and-forth movement of the vehicle's body in the vehicle's line of travel can be determined. This modification of the target from one used solely for vertical vibrational movements to the one required here for more accurate measurements is shown in FIG. 7c. FIG. 7a shows the target 11 consisting of concentric black and white rings, which is applied to the wheel. FIG. 7b shows a target 12 which is applied to the body, and is used in cases where only the vertical vibrations of the body are to be measured. This target 12 consists of parallel horizontal black and white bars. FIG. 7c shows a target that makes it possible to determine the movement of the body not only in the vertical direction but also in the horizontal direction, i.e. the direction of travel. The black and white bars, which are parallel in FIG. 7b, are inclined at an angle to horizontal in one region of the target shown in FIG. 7c.

The evaluation of the test results will now be described.

It should first be mentioned that the computation method described below is based on a simplified model of a motor vehicle, shown in FIG. 2. In this model: $m_1$ is the mass of the wheel 4 and wheel axle; $m_2$ is the mass of the body 9, including any load carried in the vehicle being tested; the coefficient $c_1$ designates the spring constant, which is given by the tyre-elasticity; and this elasticity experiences a damping designated by $d_1$.

The body 9 is connected to the wheel 4 by a spring 10 whose spring constant is $c_2$. The vibration of the spring 10 is damped by a shock-absorber whose damping constant is $d_2$.

Figure 2:
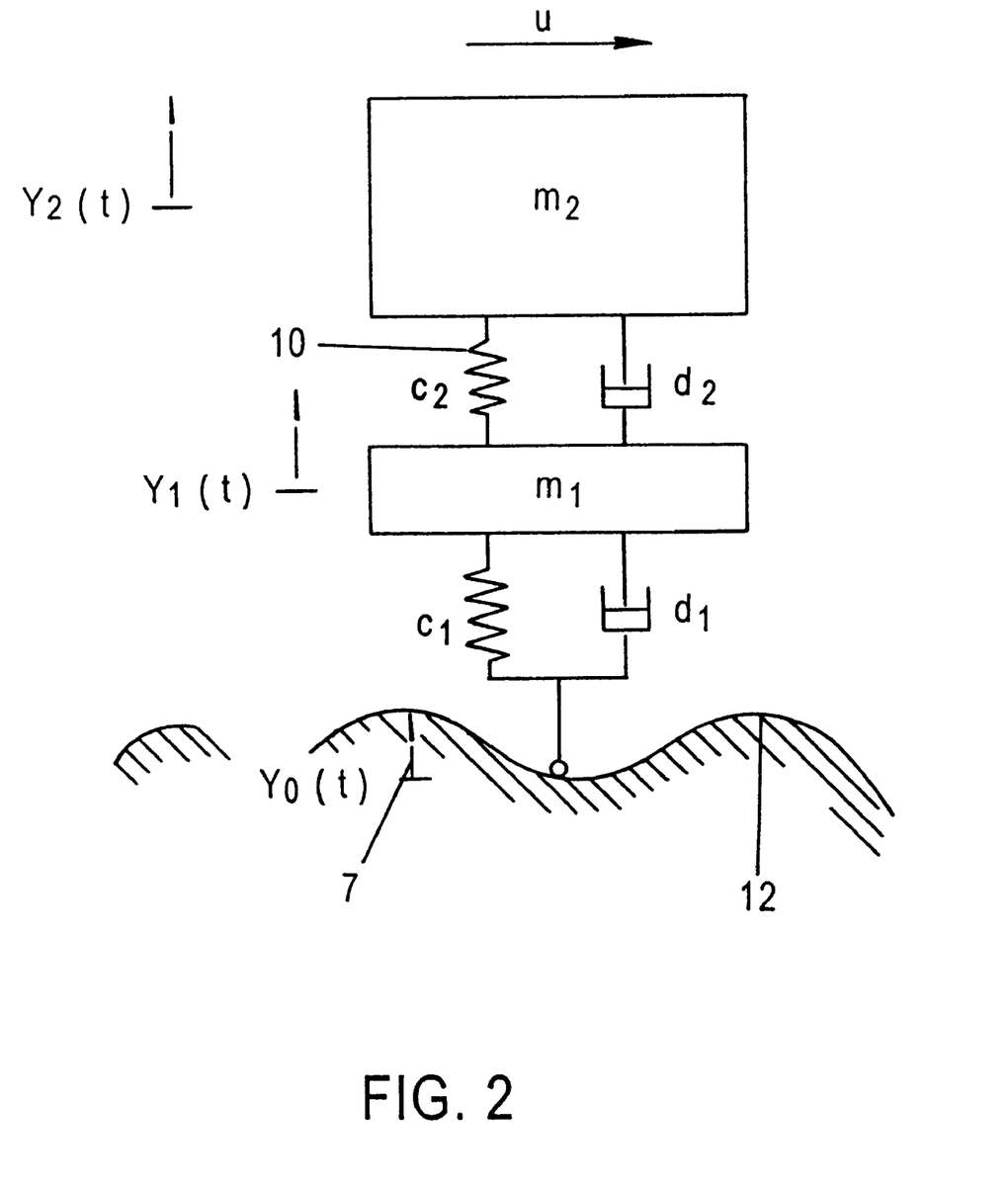
FIG. 2 is an equivalence-model representing the forces occurring in a moving motor vehicle.

The roadway 12 indicated in FIG. 2 has an uneven surface. Its maximum unevennesses correspond to the residual rebound clearance, i.e. the drop distance 7 of the test stand.

The model shown corresponds to a vibrating-system in which the masses $m_2$ and $m_1$ are connected to each other by two series-connected damped springs. The equations of motion of a two-mass vibrating-system of this type are as follows, assuming that the spring forces and damping forces are linear functions of the relative excursion and relative velocity respectively:

$$m_2 \cdot \ddot{y}_2(t) + d_2 \cdot [\dot{y}_2(t) - \dot{y}(t)] + c_2 \cdot [y_2(t) - y_1(t)] = 0 \qquad 1.$$

$$m_2 \cdot \ddot{y}_2(t) + d_2 \cdot [\dot{y}_1(t) - \dot{y}_2(t)] + c_2 \cdot [y_1(t) - y_2(t)] +$$
$$d_1 \cdot [\dot{y}_1(t) - \dot{y}_0(t)] + c_1 \cdot [y_1(t) - y_0(t)] = 0 \qquad 2.$$

in which $m_1$ = means the moving masses of the wheel, wheel-axle, and wheel-suspension;

$m_2$ = is the moving portion of the mass of the vehicle body;

$c_1$ = tyre-elasticity;

$c_2$ = stiffness of vehicle-spring;

$d_1$ = tyre damping; and $d_2$ = damping constant of a shock-absorber installed in the vehicle.

$y_0(t)$ = the translational vibration of the base, as a function of time;

$\dot{y}_0(t)$ = the velocity of the base, as a function of time;

$y_1(t)$ = the translational vibration of the wheel, as a function of time;

$\dot{y}_1(t)$ = the wheel velocity, as a function of time;

$\ddot{y}_1(t)$ = the wheel acceleration, as a function of time;

$y_2(t)$ = the translational vibrations of the body, as a function of time;

$\dot{y}_2(t)$ = the velocity of the body, as a function of time; and $\ddot{y}_2(t)$ = the acceleration of the body, as a function of time.

The two equations of motion can be combined into a differential equation, by introducing the difference between motion of the wheel and that of the body, in place of the vibration-amplitudes thereof, thus obtaining:

$$m_1 \cdot \ddot{x}(t) + d_2 \cdot A \cdot \dot{x}(t) + c_2 \cdot A \cdot x(t) = f(t) \qquad 3.$$

where:
a) $x(t)=y_2(t)-y_1(t)$, with $Y_2$, and $y_1(t)$ being measured values, namely the curves of displacement of the body and the wheel over time (the displacement-difference being computed!);

b)
$$A = 1 + \frac{m_1}{m_2}$$

are measured values for the wheel and body c) $f(t)=-d_1 \cdot [\dot{y}_0(t)-\dot{y}_1(t)]-c_1 \cdot [y_0(t)-y_1(t)]$ is likewise a measured quantity, namely the curve of the wheel contact forces (dynamic wheel load) over time.

The Fourier spectrum of the wheel contact force over frequency is known in the art. It is plotted again in FIG. 3.

Figure 3:
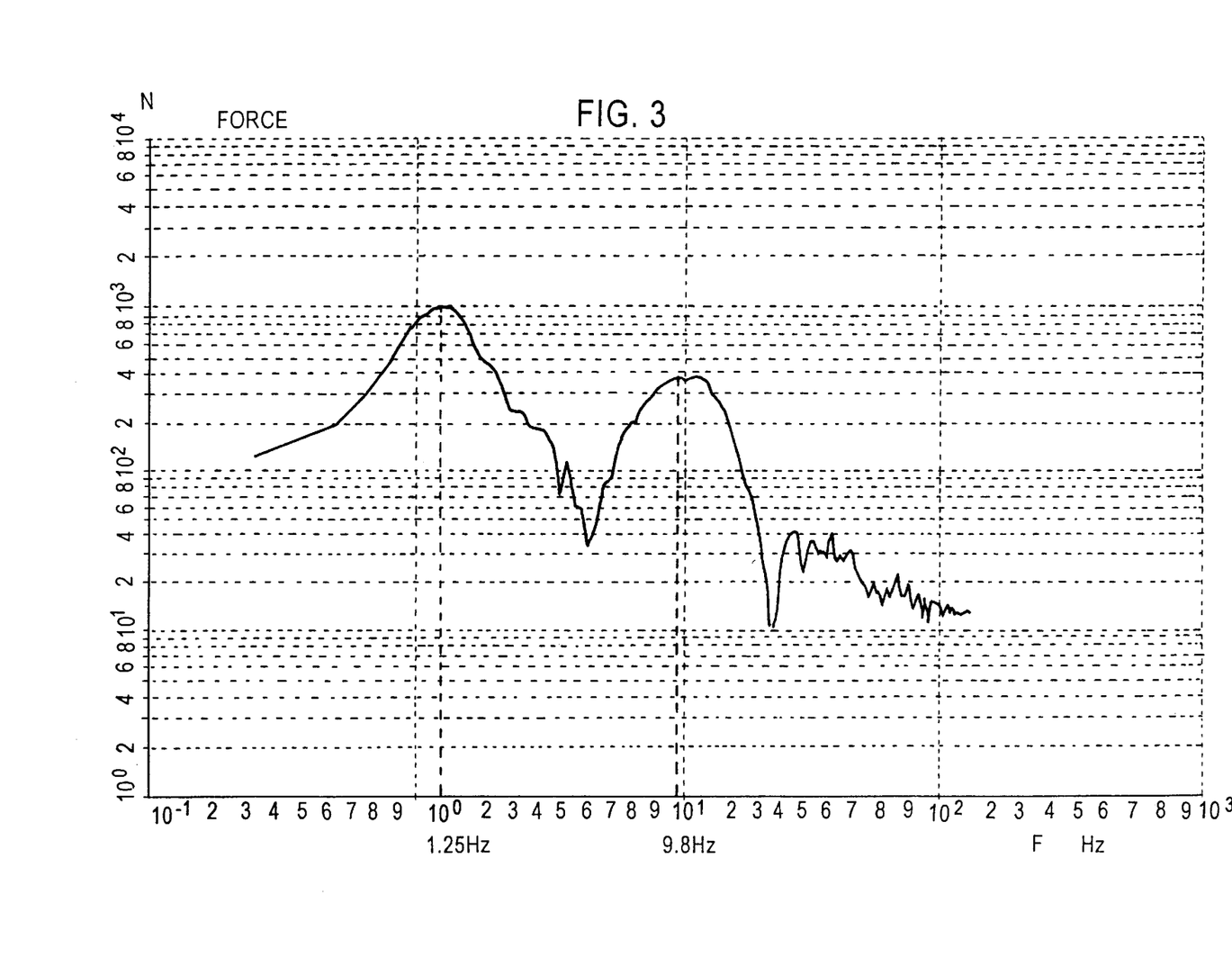
FIG. 3 is a plot of the vibration frequency of the wheel contact force, as obtained with the test set-up shown in FIG. 1.

In the chart, the frequency is shown on the horizontal axis, with a logarithmic scale running from $10^{-1}$ to $10^{-3}$ Hz. The wheel contact force is shown as f(t) on the vertical scale, which runs from $10^0$ to $10^{4N}$. At approximately 1.25 Hz, a first maximum occurs, corresponding to the vibration of the body. At approximately 9.8 Hz, the second maximum occurs, corresponding to the wheel frequency.

Before the above-described method of determining the individual parameters was decided on, testing was performed to determine whether the idealized model on which the method is based was in fact applicable, because e.g. vibrations are also set up in the untested wheel-axis when the vehicle is dropped onto the base.

Therefore the test vehicles were first equipped with a total of 8 measuring sensors, which were attached to the body- and wheel-axes at intervals.

The results showed, however, that scarcely any rotational movements occur around the longitudinal axis of the vehicle, and therefore little vibration energy is transmitted from one side of the vehicle to the other. Also, the untested wheel-axis has little effect on the tested wheel-axis; little vibration energy is transmitted to the latter.

Accordingly it appears possible to consider the left and right sides of the vehicle separately from each other in the region of the tested wheel-axis, and without regard to the wheel-axis that is not being tested. In other words, the above-described equivalence-model of a two-mass vibrating system can be applied without fear of falsifying the results.

Using the measuring system shown in FIG. 1, it is therefore possible to measure the curve of the wheel contact forces f(t) over time by means of the weighing device 6, and to determine x(t) by means of the displacement-measuring system 8a and 8b. Suitable programming of a computer to which the large number of measurement signals from the weighing unit 6 and the displacement-measuring system 8a, 8b were fed, enabled the desired model parameters m, d, and c to be computed according to the least-squares method of estimating true values from measured values subject to error.

Figure 4:
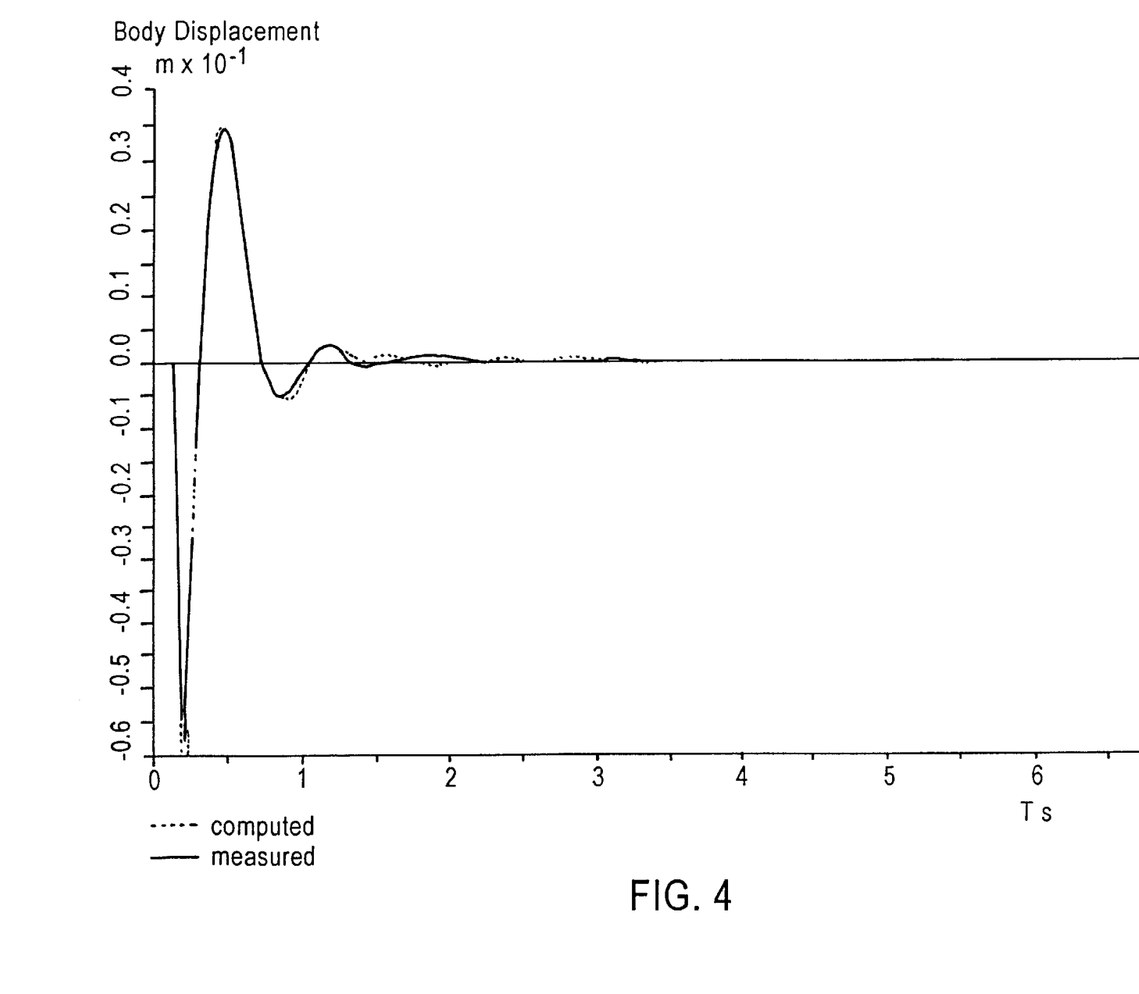
FIG. 4 is a plot of the values obtained experimentally when measuring the vibrational displacement of the body and wheel, compared with the calculated values (test set-up according to FIG. 1)

In FIG. 4, the computed and measured values are plotted against time in seconds, using the inductive measuring method for the difference in displacements. It can be seen clearly that the two curves match each other well.

This shows that the chosen computation-method is suitable.

After the model parameters m, c, and d have been determined, however, the effective values for the wheel mass $m_1$, body mass $m_2$, spring-stiffness $c_2$, and damping constants $d_2$ can now be determined, because the static part of the wheel contact force fst provides a relation between these values: $f_{st}=m_1+m_2+g$, where g is the acceleration due to gravity=9.8065 m/[s$^2$]. The following relations of the chosen model-parameters (m, c, and d) to $m_1$, $m_2$, $d_2$, and $c_2$ also apply:

$$m_1=m$$

$$m_2=f_{st}/g-m_1$$

$$d_2=d \cdot m_2 \cdot g/f_{st}$$

$$c_2=c \cdot m_2 \cdot g/f_{st}$$

The above concepts and relations make it possible to produce a symmetrical (tension:compression=1:1) linear damping characteristic with reference to the wheel contact point for a shock-absorber installed in a motor vehicle. In practice, however, the shock-absorbers used generally have an asymmetrical characteristic curve.

Here, the required result will be obtained either by having a regional linear equation-arrangement for the damping force, or by having a quadratic arrangement with linear and quadratic terms of different magnitudes in the tension and compression regions.

Figure 5:
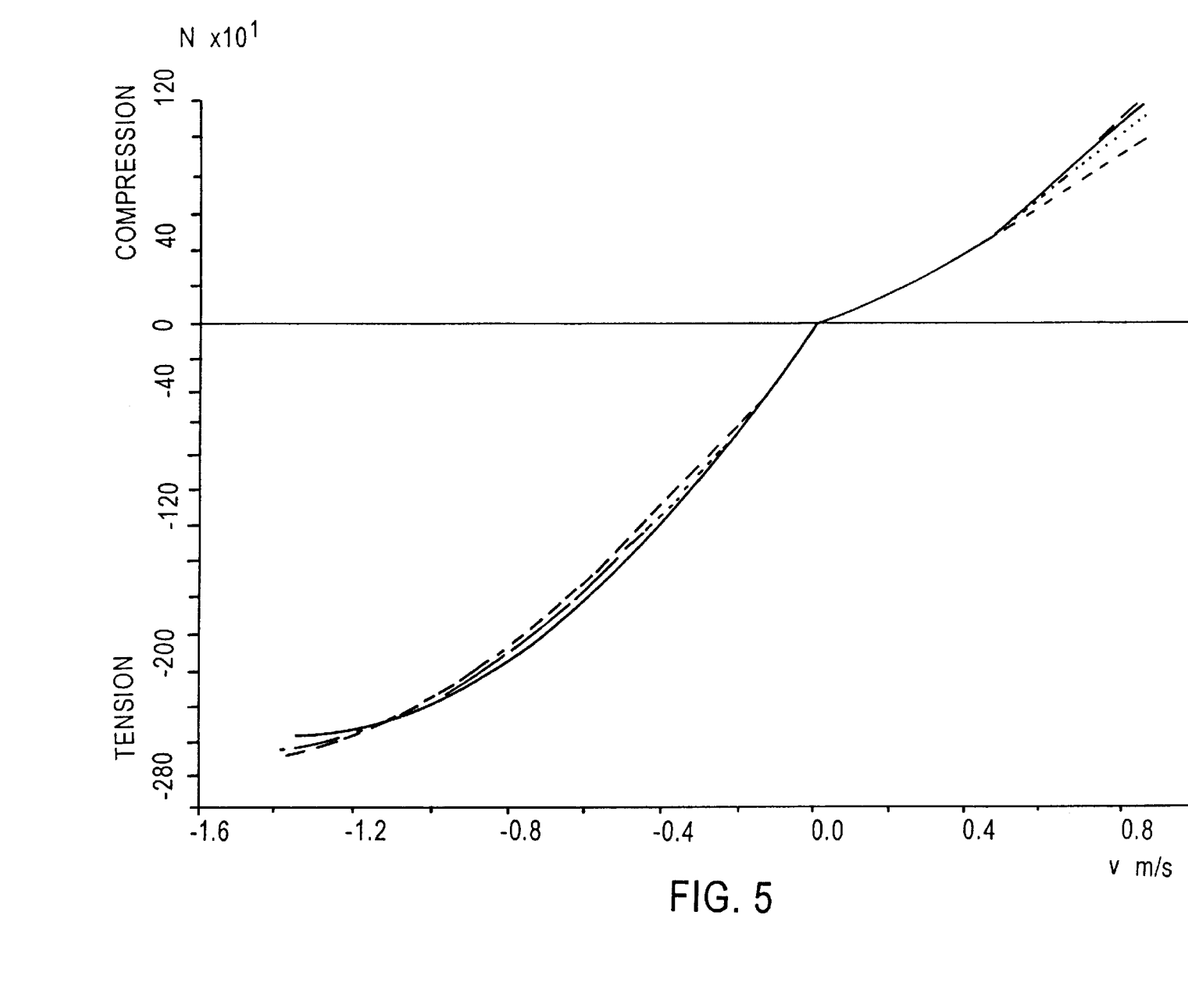
FIG. 5 is a plot of the characteristic curves obtained with repeated tests (test set-up according to FIG. 1)

FIG. 5 shows the test results from five tests on a Mercedes motor vehicle. As can be seen from the plots in FIG. 5, there were scarcely any differences between the individual results. The computed values for the parameters show deviations from the measured values of between 1 and 2%.

The test set-up for these last-mentioned measurements corresponded to that of FIG. 1. An inductive measuring system was used.

The measuring method used was: the determination of the difference in displacements. The measured values from the displacement-measurement system and the weighing unit were fed into a computer, whose software was programmed according to the mathematical vibration equations.

The same test set-up can also be used for determining the individual amplitudes of the body and wheels by means of the displacement-measurement system; but this in no way changes the principle of the computing method.

It is however also possible, and in certain cases advantageous, to compute the desired values by using a measuring system in which the velocity-differences between the body and the wheel-masses are determined, instead of by determining the difference in displacements. Similarly, a measuring method can also be chosen in which the acceleration-differences between said measured quantities are determined. Apparatuses suitable for this purpose are known to persons skilled in the art, and therefore the test set-up for these measuring methods need not be explained in detail here.

Figure 6:
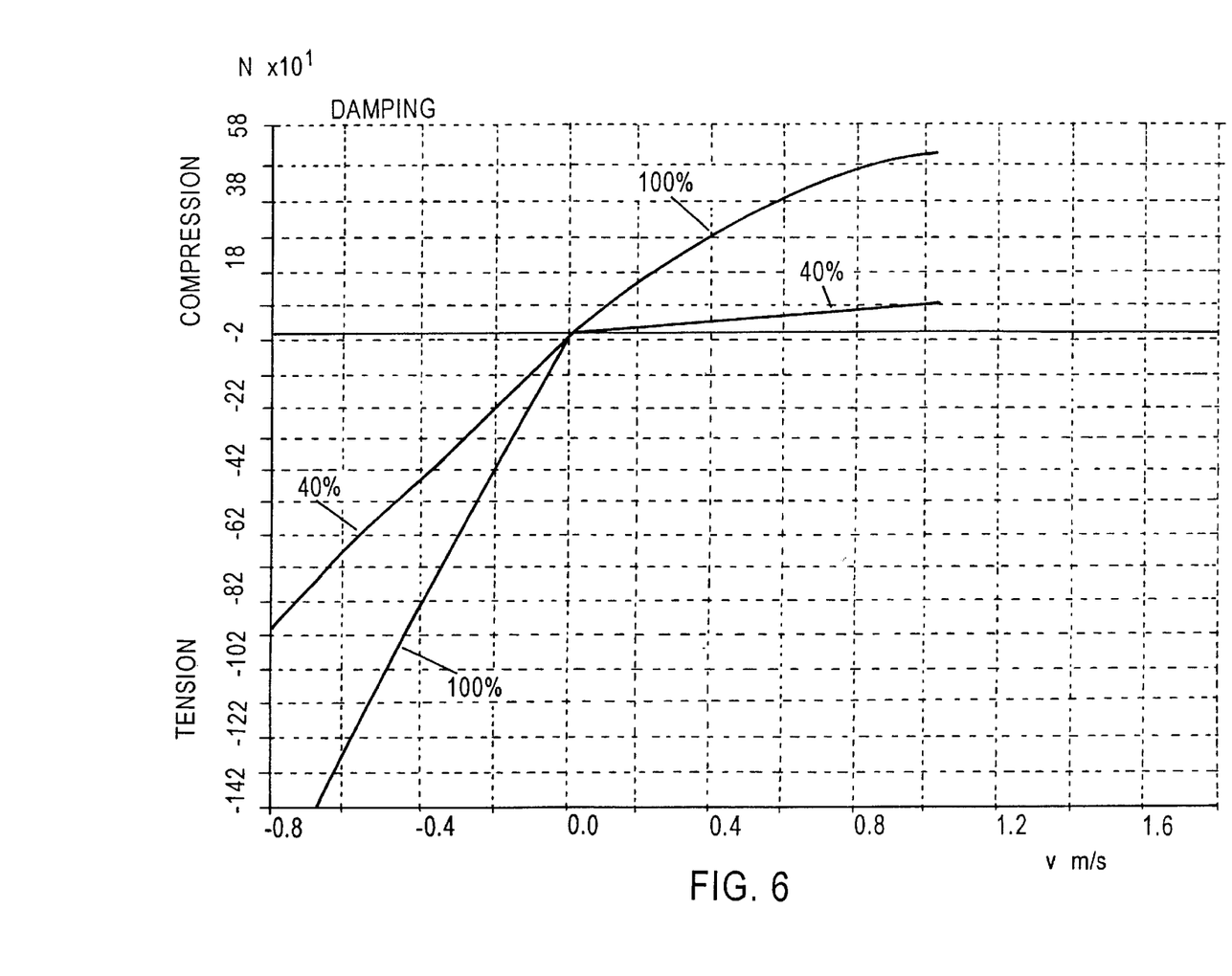
FIG. 6 shows characteristic curves of damping obtained for a vehicle with shock-absorbers of differing quality (test set-up according to FIG. 1)

FIG. 6 illustrates the efficacy of the method according to the invention.

This graph shows the characteristic curves of damping for different test series performed on the same test vehicle. For determining these characteristic curves, the test vehicle was first tested without modification. Then the new right rear shock-absorber was replaced by a 40% shock-absorber and the vehicle was tested again.

Consideration of the damping curves shows that the residual damper performance values are of different magnitudes in the tension and compression regions. Whereas the residual damper performance in the compression region is approximately 13%, it is 53% in the compression region.

By performing such an evaluation, it may be possible to determine the type of damage to the shock-absorber on the basis of the change in the characteristic curve.

From what has been said above, it can clearly be seen that the shock-absorber testing method according to the invention sets new standards for evaluating the characteristic curves representing the condition of a motor vehicle.

The claims defining the invention are as follows:

1. A process for determining a response to a force shock-absorbers installed in a motor vehicle, comprising:
   (a) positioning the motor vehicle on a support surface of a ramp,
   (b) removing suddenly the support surface so that the motor vehicle drops a predetermined distance from the support surface onto a base, said predetermined distance corresponding to a predetermined residual rebound clearance defined by the vehicle's design specifications,
   (c) measuring wheel contact forces exerted on the base as a function of time when the wheels of the motor vehicle hit the base,
   (d) measuring at least one of a displacement, a velocity, and an acceleration of the vehicle body and of at least one wheel as a function of time, and
      computing using results of said measuring steps (c) and (d) values for at least one of a vehicle body mass, a wheel and wheel axle mass, a vehicle spring-stiffness, a tire spring constant, a tire damping constant, and a shock absorber damping constant.

2. A process as claimed in claim 1, wherein said measuring step (d) comprises measuring a displacement of the vehicle body and at least one wheel.

3. A process as claimed in claim 2 wherein said displacement is measured by (i) determining individually the vibration-amplitudes of the body relative to the base and those of the wheel relative to the base, or (ii) a difference in amplitude between these two vibration-amplitudes.

4. A process as claimed in claim 1, wherein said measuring step (d) comprises measuring a velocity of the the vehicle body and said at least one wheel.

5. A method as claimed in claim 1, wherein said measuring step (d) comprises measuring an acceleration of the vehicle body and said at least one wheel including at least a period of time when the wheel contacts the base following the step of removing suddenly said support surface.

6. A device for implementing the process as claimed in claim 1, comprising:
   a ramp and support-surface for the motor vehicle, said support-surface being arranged removably above a base at a vertical distance therefrom corresponding approximately to the motor-vehicle's residual rebound clearance, and
   a measuring device for determining the wheel contact force acting on the base as a function of time after the motor-vehicle has been dropped onto said base,
   wherein a measuring system is provided to measure at least one of a displacement, a velocity, and an acceleration of the vehicle body and of at least one wheel as a function of time.

7. A device for implementing the process as claimed in claim 6, wherein said measuring system comprises an inductive pick-up.

8. A device for implementing the process as claimed in claim 7, wherein said measuring system comprises a means for measuring velocity.

9. A device for implementing the process as claimed in claim 6, wherein said measuring system comprises a means for measuring acceleration.

10. A device for implementing the process as claimed in claim 6, wherein said measuring system comprises a laser.

11. A device for implementing the process as claimed in claim 6, wherein said measuring system comprises an image-recording system.

12. A device for implementing the process as claimed in claim 6, further comprising a computer, wherein measured values of said wheel contact forces exerted on the base when the wheels of the motor vehicle hit the base and measured values of said at least one of a displacement, a velocity, and an acceleration of the vehicle body and of at least one wheel are input into the computer, which is programmed to output values for at least one of a vehicle body mass, a wheel and wheel axle mass, a vehicle spring-stiffness, a tire spring constant, a tire damping constant, and a shock absorber damping constant.

* * * * *